United States Patent [19]
Bolton

[11] Patent Number: 5,004,088
[45] Date of Patent: Apr. 2, 1991

[54] TORSIONAL VIBRATION DAMPER

[75] Inventor: John S. Bolton, Knowle, England

[73] Assignee: Automotive Products plc, Leamington Spa, England

[21] Appl. No.: 411,510

[22] PCT Filed: Feb. 22, 1988

[86] PCT No.: PCT/GB88/00109

§ 371 Date: Nov. 1, 1989

§ 102(e) Date: Nov. 1, 1989

[87] PCT Pub. No.: WO88/08092

PCT Pub. Date: Oct. 20, 1988

[30] Foreign Application Priority Data

Apr. 9, 1987 [GB] United Kingdom ............... 8708536

[51] Int. Cl.$^5$ .............................................. F16D 3/14
[52] U.S. Cl. ............................ 192/106.2; 192/70.17; 464/68
[58] Field of Search ............... 192/106.1, 106.2, 70.17; 464/64, 68

[56] References Cited

U.S. PATENT DOCUMENTS

| | | | |
|---|---|---|---|
| 3,138,011 | 6/1964 | Stronberg | 464/64 |
| 3,327,820 | 6/1967 | Maurice | 464/68 X |
| 4,406,357 | 9/1983 | Nagano et al. | 192/106.2 |
| 4,410,075 | 10/1983 | Caray et al. | 192/106.2 |
| 4,485,908 | 12/1984 | Gatewood | 192/106.2 |
| 4,493,408 | 1/1985 | Nagano | 192/106.2 |
| 4,494,642 | 1/1985 | Hashimoto | 192/106.2 |
| 4,545,473 | 10/1985 | Alas | 464/68 X |
| 4,557,702 | 12/1985 | Takeuchi | 464/68 |
| 4,674,992 | 6/1987 | Carmillet et al. | 464/68 |

FOREIGN PATENT DOCUMENTS

| | | |
|---|---|---|
| 0172100 | 2/1986 | European Pat. Off. . |
| 3502229 | 7/1986 | Fed. Rep. of Germany . |
| 8611990 | 8/1986 | Fed. Rep. of Germany . |
| 2492024 | 4/1982 | France . |
| 2568649 | 2/1986 | France . |
| 2000257 | 1/1979 | United Kingdom . |
| 2152187 | 7/1985 | United Kingdom . |

Primary Examiner—Rodney H. Bonick
Assistant Examiner—Andrea Pitts
Attorney, Agent, or Firm—Marjama & Pincelli

[57] ABSTRACT

A rotary coupling device has a hub driving a hub flange formed with windows containing helical compression springs. Those springs are also contained in windows in disc-like side plates rivetted together to form a carrier for friction material. The springs are also contained in windows respectively in floating disc-like plates. The windows are so dimensioned that an initial relative rotation between the friction material carrier and the hub and hub flange, causes one of the springs to be compressed and urge the floating plates to rotate relatively to the carrier or to the hub and hub flange so that the relative movement between the floating plates and the carrier or the hub and hub flange compreses the other of the springs. Thus during this initial movement the springs are compressed in series. Once the relative rotation between the carrier and the hub and hub flange exceeds a certain angle, the plates no longer take part in the compression of the springs which are now compressed in parallel between the carrier and the hub and hub flange.

10 Claims, 7 Drawing Sheets

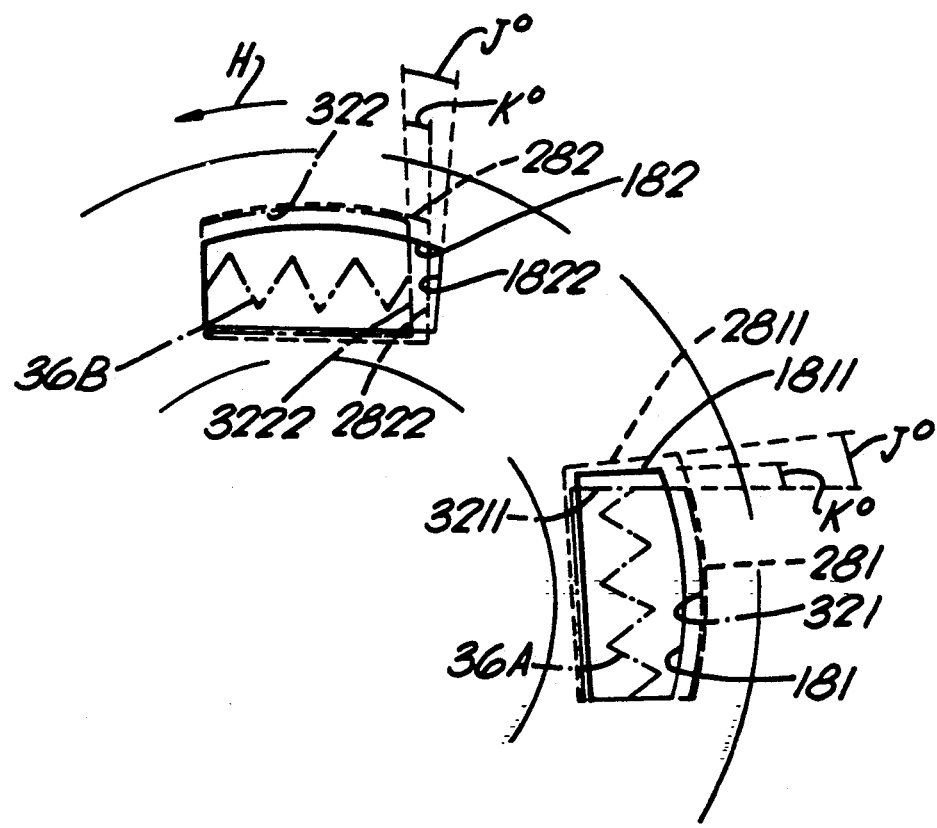
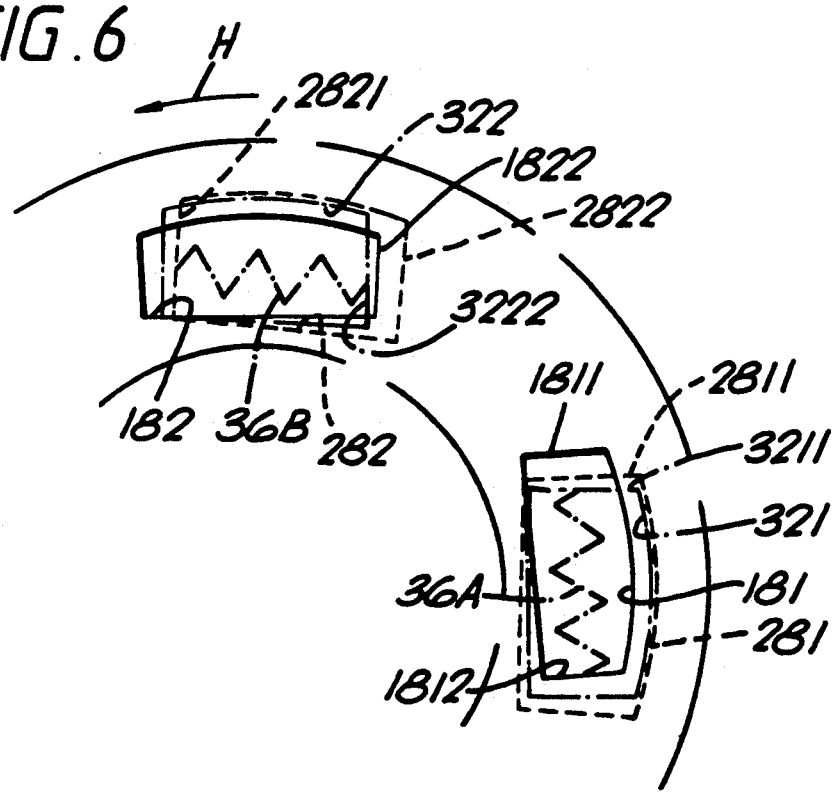

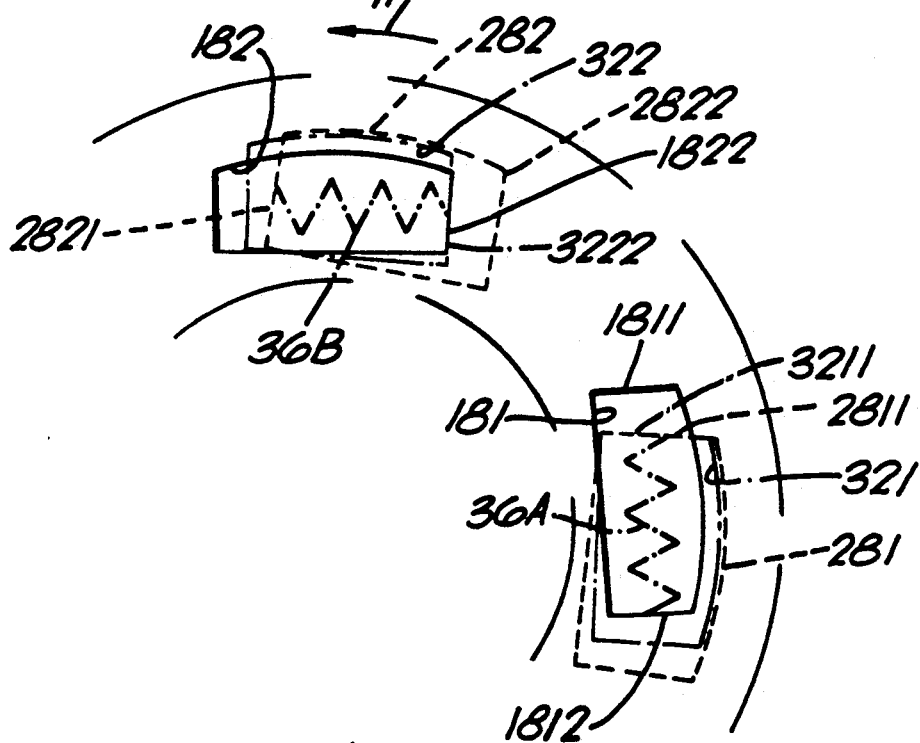
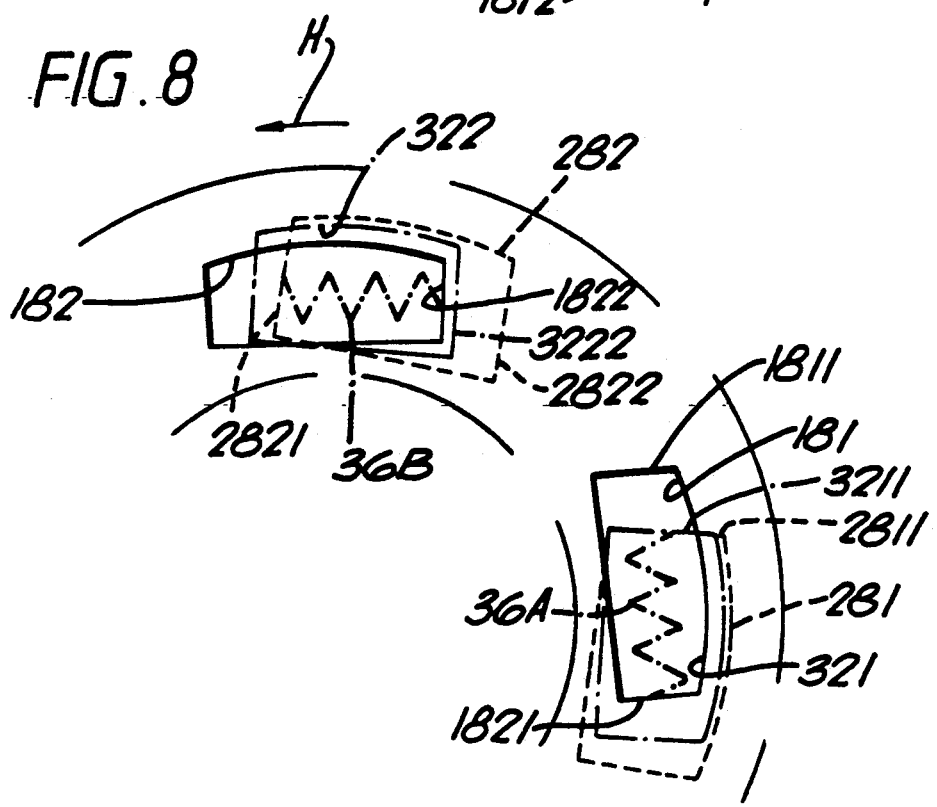

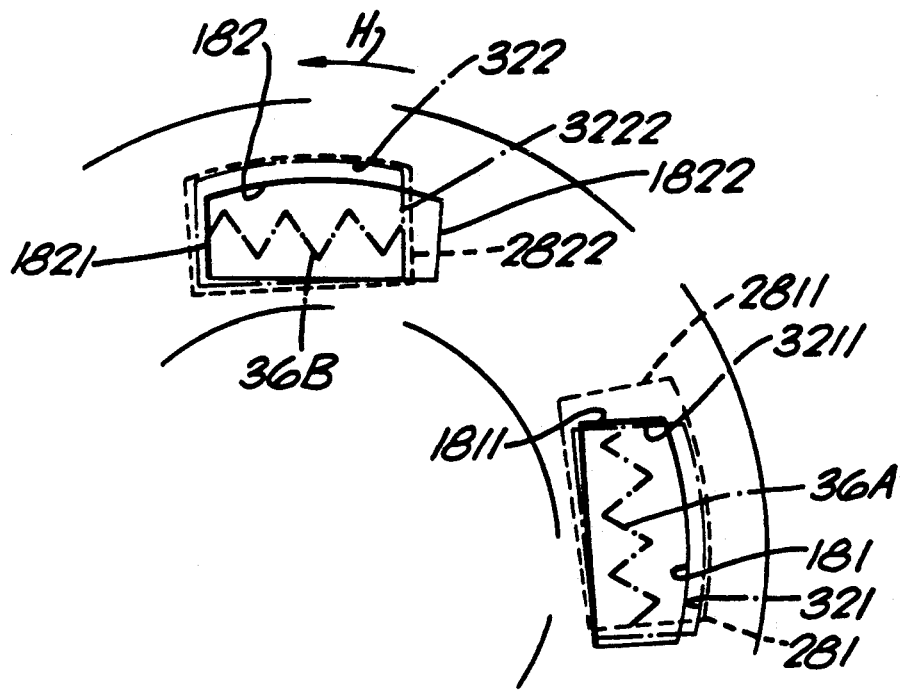
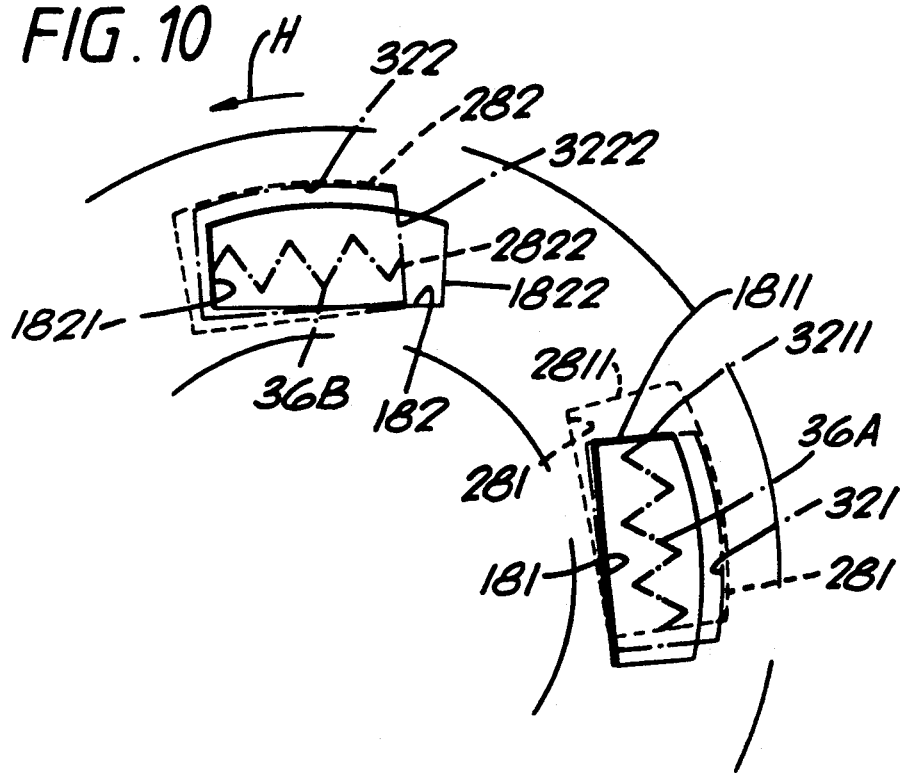

TORSIONAL VIBRATION DAMPER

This invention relates to a torsional vibration damper and more particularly to a rotary coupling device comprising the damper to damp out torsional or rotary vibrations superimposed on a rotary motion input to the coupling so that a rotary motion output from the coupling may be free of said vibrations or at least they may be reduced.

The rotary coupling device is of a type (hereinafter called the "type referred to") intended for rotation about an axis and comprising a first component part and a second component part each rotatable about the axis and also capable of a rotation one relative to another about said axis, a plurality of compression spring means disposed between the first and second component parts, said spring means being capable of transmitting rotary motion from one said component part to the other, and each said spring means being compressible along a circumferential direction (with respect to the rotation about said axis) by relative rotary movement between said first and second component parts.

Each spring means can be of any suitable, compressible, elastically deformable kind, for example a helical spring or a rubber cushion.

One example of a coupling device of the type referred to is a driven plate for a friction clutch. In the driven plate one said component part is formed by an annular array of friction material on a disc-like carrier plate and the other said component part is a disc-like flange axially spaced from the carrier plate. That flange either has a central aperture lined with axial splines or is rotationally fast with a hollow hub lined internally by axial splines, said splines being to mesh with axial splines on a shaft. The carrier plate and flange each have windows containing said spring means. The driven plate is included in a clutch provided with a pressure plate arranged to releasably clamp the driven plate against a rotatably driven counter-pressure plate. That counter-pressure plate may be driven by an engine of a motor vehicle and can be the fly-wheel of the engine. Therefore said shaft may be an input shaft to a gearbox in a transmission of the vehicle.

Another example of a coupling device of the type referred to is a divided or split fly-wheel in which said first component part is a first fly-wheel arrangement axially spaced from the second component part formed by a second fly-wheel arrangement, the two fly-wheel arrangements being interconnected using said plurality of spring means. A split fly-wheel as aforedescribed may be used as a fly-wheel of a motor vehicle engine. One of said fly-wheel arrangements can form a counter-pressure plate of a clutch whilst the initial rotary drive is input to the other fly-wheel arrangement. An example of such a split fly-wheel is described in published British Patent Application GB 2166 220 A.

In known coupling devices of the type referred to, the relative rotation between said first and second components is a function of the rates of the respective spring means and the value of the driving input torque applied to one of said first or second components when the other component experiences retardation caused by inertia and friction Often the various spring means are arranged so that one or more have low spring rates and one or more have higher rates. The arrangement is that the spring means are staggered so that the initial relative rotary movement between the first and second components compresses the low rated spring means until the torque input reaches a value where the low rated spring means have allowed a sufficient relative movement between the first and second components, that the respective higher rated spring mean start to be compressed.

An object of the invention is to provide a coupling device of the type referred to capable of being constructed to increase the input torque range over which lower spring rate torsional vibration damping is available.

According to the invention, there is provided a rotary coupling device of the type referred wherein there are at least first and second said spring means so arranged that during an initial part of said relative rotary movement the first and second spring means are compressed in a series relation in which the compression of each of the first and second spring means is only a fraction of the accomplished relative rotary movement between the first and second component parts, and during a later stage of the relative rotary movement said first and second spring means are compressed in a parallel relation.

An advantage is that low rate spring damping over an extended initial range of torque input can be achieved without the need to use excessively long weak springs to provide a first damping stage as would be the case if the weak first stage damping over an extended torque range were achieved by first and second spring means compressed in parallel. Also, during the first stage of damping, the actual compression of each the first and second spring means can be considerably less than the relative rotary movement (deflection) between the first and second component parts to achieve that compression. This reduction in compression for a given deflection can extend the life of the spring means.

The invention will now be further described, by way of example, with reference to the accompanying drawings in which:

FIG. 1 additionally shows diagrammatically a driven counter-pressure plate and also a fragment of a diaphragm spring being part and representative of a friction clutch cover assembly;

FIG. 5 is a diagrammatic view representing a fragment of FIG. 4 when the driven plate is in the "central" position, this view correlating FIG. 4 with following FIGS. 6 to 11;

Figure 1:
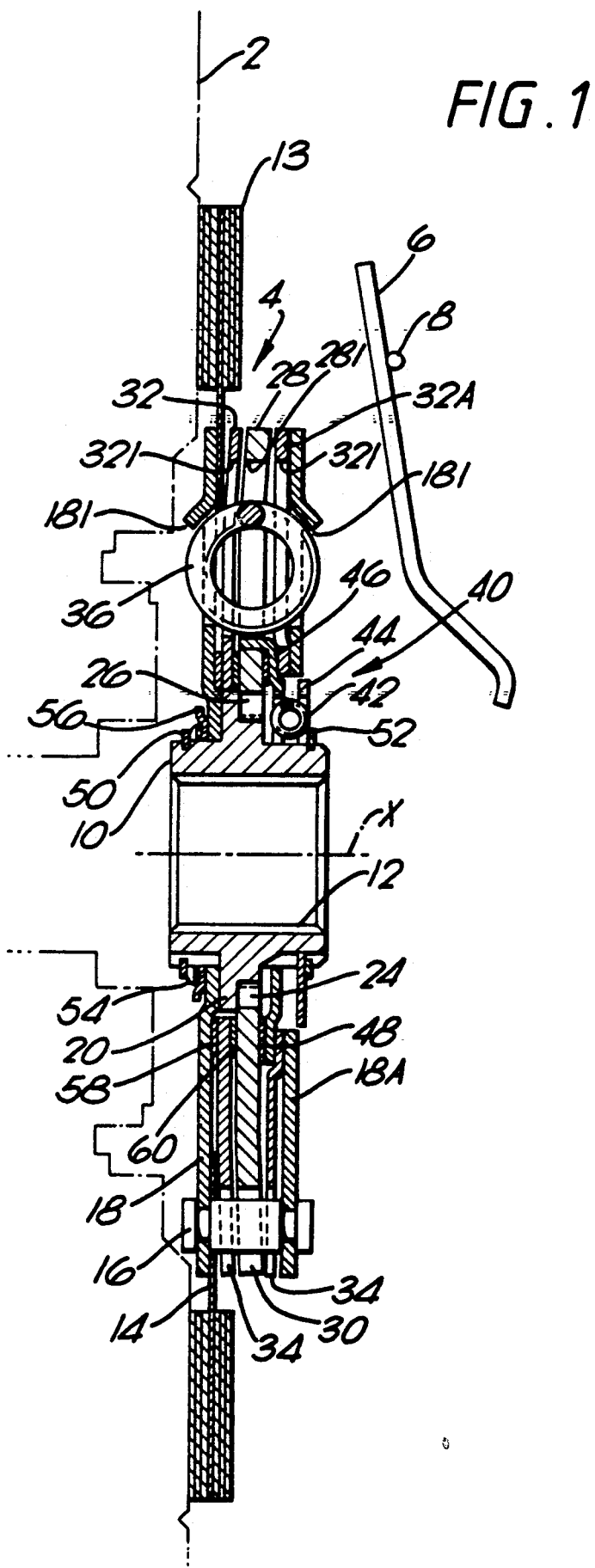
FIG. 1 is a cross-section of a driven plate formed according to the invention, for a friction clutch.
Figure 4:
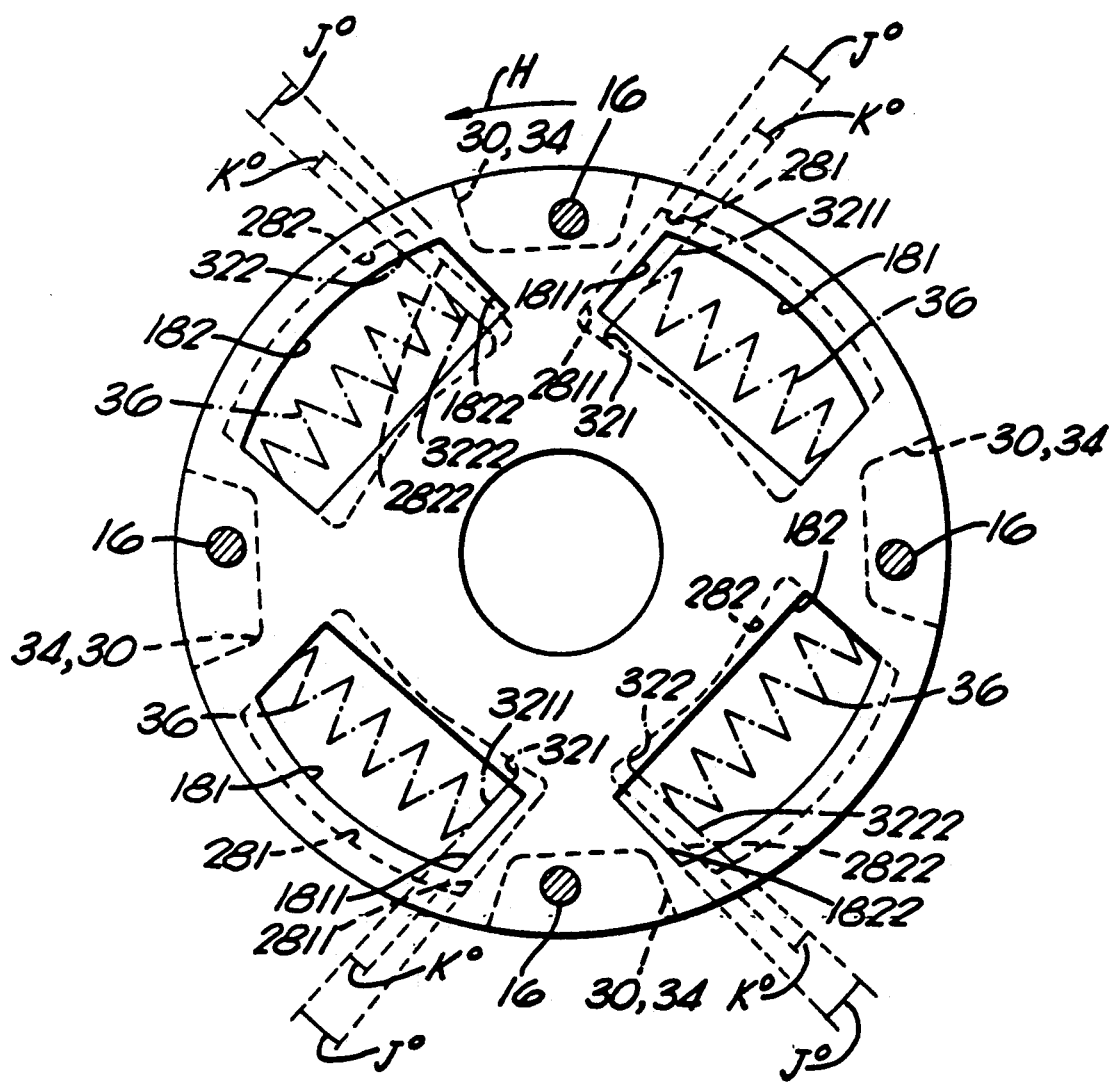
FIG. 4 is a side view of a said side plate and illustrates a relationship between windows (containing helical springs) in the side plate, in the hub flange, and in a said floating disc of the driven plate in FIG. 1 when in the "central" position.
Figure 11:
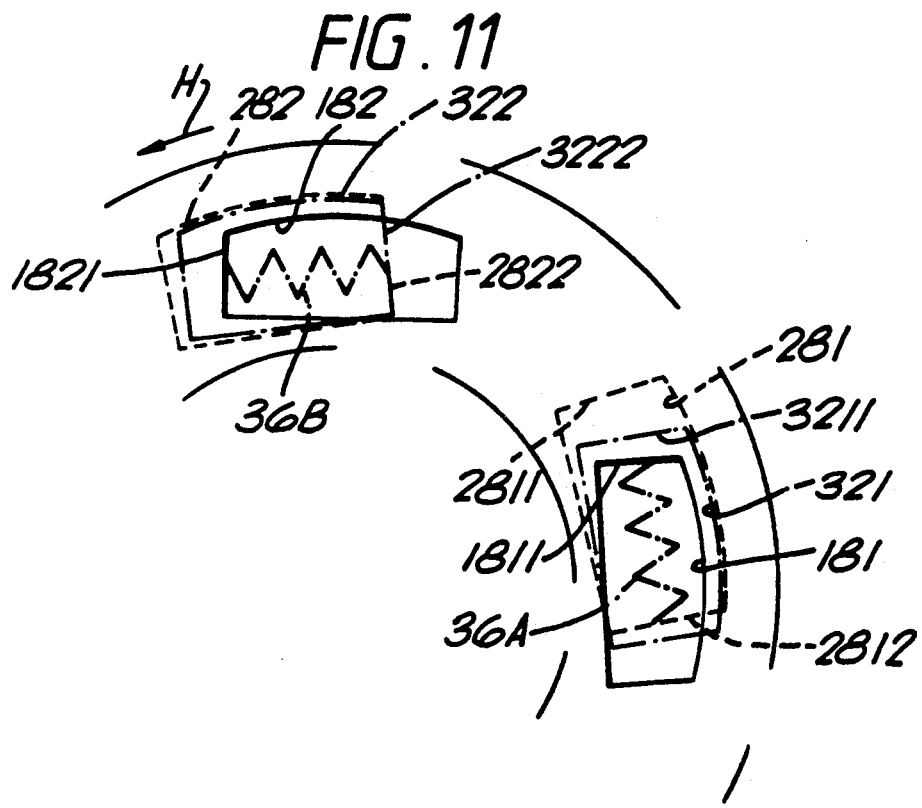
Figure 12:
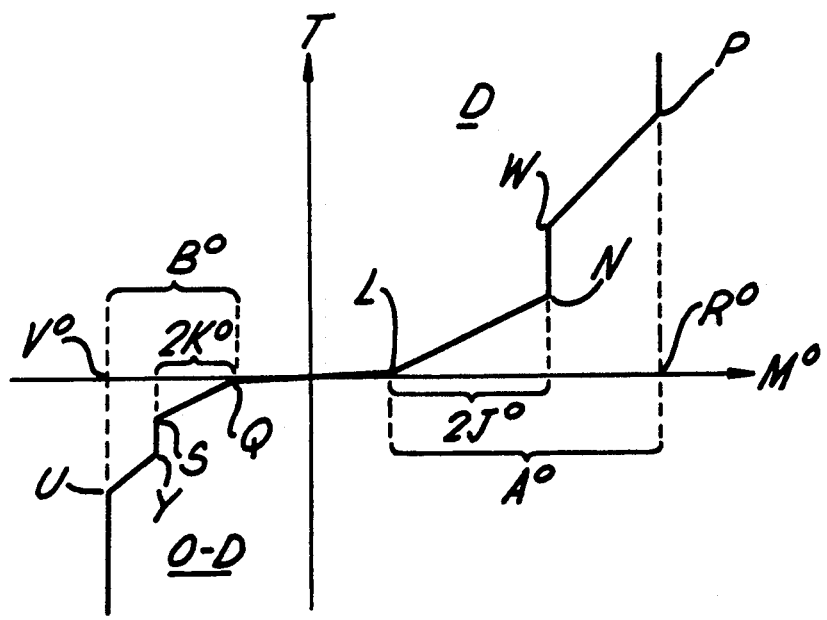

FIGS. 6 to 8 diagrammatically illustrate a drive condition of the driven plate represented by FIGS. 4 and 5; in this drive condition the clutch is engaged and torque is input to the driven plate from the counter-pressure plate, FIG. 6 showing a situation during first stage damping, FIG. 7 showing the end of the first stage, and FIG. 8 showing second stage damping;

FIGS. 9 to 11 diagrammatically illustrate an over-drive condition of the driven plate represented by FIGS. 4 and 5; in this over-drive condition the clutch is engaged and torque is input to the driven plate through a hub thereof, FIG. 9 showing a situation during first stage damping, FIG. 10 showing the end of that first stage, and FIG. 11 showing second stage damping, and FIG. 12 shows a graph representing variation in relative angular movement M° (in angular degrees) between hub flange 28 and carrier assembly 18, 16, 18A with variation in torque input T at drive D and overdrive O-D in a clutch provided with the driven plate in FIG. 1 in a motor vehicle.

With reference to FIG. 1 a clutch is illustrated diagrammatically by:

(i) a rotatably driven counter-pressure plate 2, for example a fly-wheel, which could be driven by an engine of a motor vehicle;

(ii) a clutch driven plate 4; and (iii) a clutch cover assembly represented by fragments of a diaphragm spring 6 and a fulcrum ring 8, the cover assembly further comprising a known cover (not shown) secured to be fast in rotation with the fly-wheel, an axially movable known pressure plate (not shown) within the cover and fast in rotation therewith, and the diaphragm spring acting between the cover and pressure plate to urge the latter to clamp the driven plate 4 against the counter-pressure plate 2.

The driven plate 4 has a central hub 10 for rotation about axis X. The hub bore is lined by axial splines 12 intended to engage in known manner with external axial splines on a rotatable shaft (not shown), for example an input shaft to a gearbox which could be in a transmission line of a motor vehicle.

Driven plate 4 has annularly arrayed friction material 13 secured to a carrier ring 14 which may include known metal, cushioning segments. Ring 14 is rivetted by axial stop rivets 16 to a disc-like side plate 18 surrounding the hub 10 and alongside an annular, radial rib 20 on the hub. Also secured to the stop rivets 16 is another disc-like side plate 18A axially spaced from the plate 18 so that there is formed a one-piece carrier assembly 18, 16, 18A for the friction material 13 and capable of rotating, relatively to the hub 10, about axis X.

Figure 2:
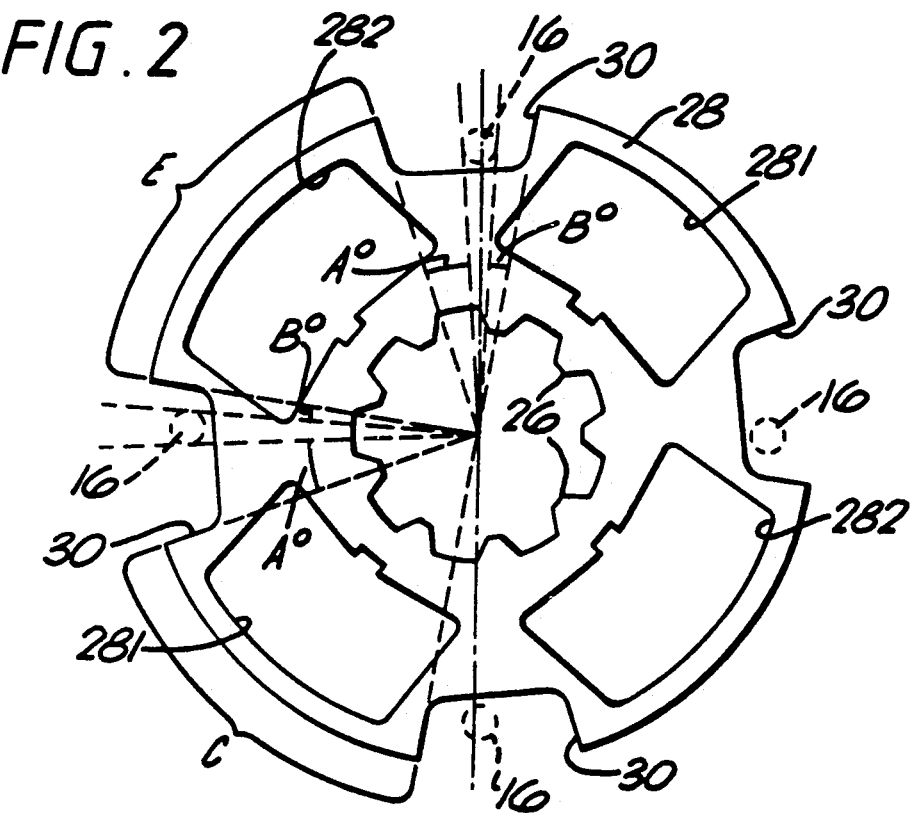
FIG. 2 is a side view of a hub flange for the driven plate in FIG. 1; the hub flange being shown, in relation to stop pins, when the hub flange and side plates and a floating disc in the driven plate are in a start or "central" position for example, when a clutch comprising the driven plate is fully disengaged and there is no torque input to the driven plate.

Part of the rib 20 is formed with axial extending splines 24 engaging with axial splines 26 around the inner periphery of a disc-like hub flange 28 (see FIG. 2). In its outer periphery the hub flange 28 has four substantially similar notches 30 through which the stop rivetts 16 pass so that a relative rotary movement between the hub flange 28 and the carrier assembly 18, 16, 18A is limited by the circumferential or angular length of each notch. When the hub flange 28 is in the "central" position each stop rivet is A° (that is A angular degrees) from one end of the respective notch 30 and B° from the other end. When the driven plate is in drive condition the maximum relative movement permitted between the hub flange 28 and carrier assembly 18, 16, 18A from the central position is A°, whilst in over-drive condition the maximum permitted relative movement is B°.

The hub flange 28 (see FIG. 2) has four windows 281 and 282. All these windows have substantially the same radial width. Circumferentially, both diametrically opposed windows 281 have the same length. Also both diametrically opposed windows 282 have the same circumferential length, but each window 281 is circumferentially shorter than each window 282. Each of the notches 30 is diametrically opposite another notch 30. All the windows 281 and 282 are substantially equi-spaced one from another and each window is substantially equi-spaced from the notches 30 adjacent thereto. Therefore, the angular spacing C between the notches 30 in one set of two adjacent notches is less than the angular spacing E between the notches in another set of two adjacent notches.

In each of the two side plates 18 and 18A there is a similar array of windows, each window in one side plate being directly opposite a similar window in the other side plate. Therefore the nature of the windows in both side plates 18 and 18A can be conveniently described with reference to the side plate 18 in FIG. 4 which has four windows 181 and 182. The two diametrically opposed windows 181 have substantially the same circumferential length. Also the two diametrically opposed windows 182 have the same circumferential length but it is greater than that of each of the windows 181. All the windows 181, 182 are substantially equi-angularly spaced apart one from another.

Figure 3:
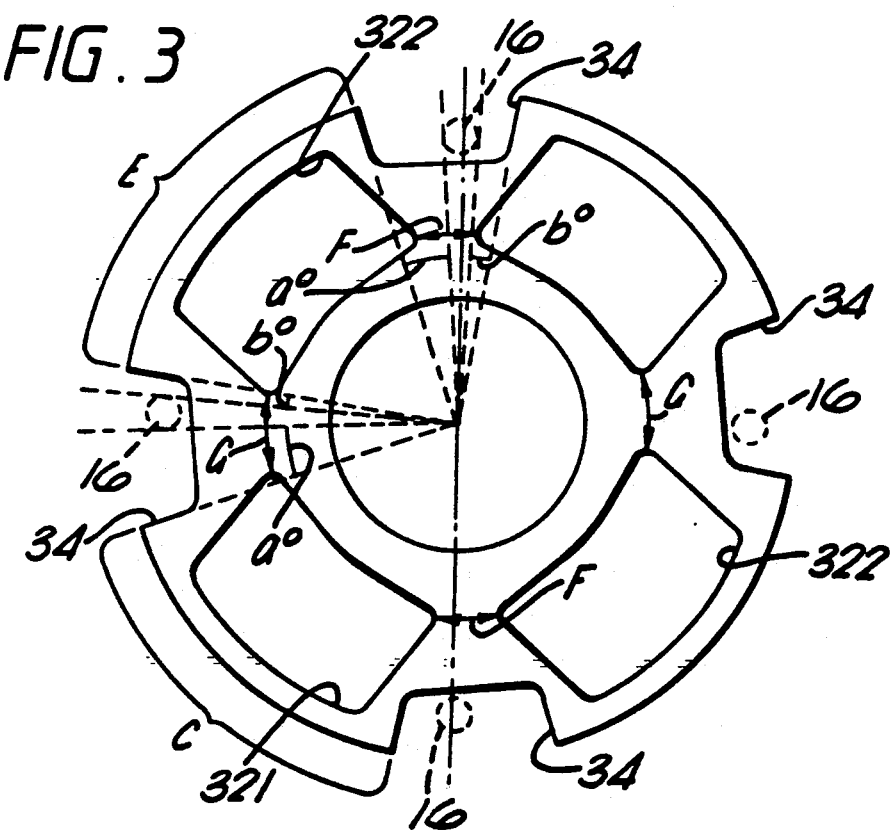
FIG. 3 is a side view of a said floating disc for the driven plate in FIG. 1, the floating disc being in the "central" position.

Two floating disc-like plates 32 and 32A between the side plates 18 and 18A are disposed to either side of the hub flange 28. Relative rotary movement can take place between the floating plates 32, 32A and the side plates 18, 18A and between the floating plates and the hub flange 28. The arrangement of peripheral notches and windows is the same in both floating plates 32 and 32A and therefore will be conveniently described with reference to FIG. 3 showing the plate 32. In that floating plate there are four similar peripheral notches 34, each two opposite notches 34 being diametrically opposed, and each notch extending over the same angular distance or circumferential length as the notches 30 (FIG. 2); in which case a° (FIG. 3) equals A° (FIG. 2) and b° (FIG. 3) equals B° (FIG. 2). There are also the angular spaces C or E between adjacent notches 34 as there are between the notches 30 (FIG. 2) as described above. If desired the notches 34 may be of a different circumferential length to the notches 30. Side plate 32 has four similar windows 321 and 322 therein, all of these windows extending over the same angular distance or circumferential length. The four windows can form four sets of two adjacent windows 321 and 322. In two opposed sets, the two windows in each set are spaced by the same angular distance F. In the other two opposed sets, the two windows are spaced by the same angular distance G which is less than F. Referring to FIGS. 1 & 4, each of the sets of windows aligned in the axial direction of the driven plate contain a respective helical compression spring 36. All the springs 36 are of substantially the same rate in this example (though they could be of differing rates) and of substantially the same initial unstressed length (though they could be of differing unstressed lengths), and when constrained in their respective sets of windows each spring is of substantially the same constrained length when the drive plate is in the "central" position. If desired the windows may be shaped and disposed so that in the "central" position of the driven plate at least one of the springs 34 has a constrained length which differs from the constrained length of another of the springs 34 With reference to FIG. 4, when the driven plate 4 (FIG. 1) is in the clutch for connecting the engine with the transmission of a motor vehicle, the driven plate is rotated in direction H during forward running of the vehicle. In that case it will be seen that all the windows 181, 281 and 321 have respective leading edges 1811, 2811 and 3211, and that all the windows 182, 282 and 322 have respective trailing edges 1822, 2822 and 3222. In each of the two sets of axially aligned windows comprising a said window 181 then, in the "central" position, the leading edge 2811 of the hub flange window 281 is circumferentially spaced from the leading edges 3211 of the two floating plates windows 321 by an angular distance J, and the leading edges 3211 are circumferentially spaced by an angular distance K from the leading edges 1811 of the windows 181 of the two side plates; whereas the trailing edges of the windows in each of those two sets are in coincidence. In each of the two sets of axially aligned windows comprising a said window 182 then, in the "central" position, the trailing edges 1822 of the side plates windows 182 are circumferentially spaced from the trailing edges 3222 of the two floating plates windows 322 by the angular distance J, and the trailing edges 3222 are circumferentially spaced by the angular distance K from the trailing edge 2822 of the window 282 of the hub flange; whereas the leading edges of the windows in each of those two sets are in coincidence. The angular value J represents the angle of the relative rotation between the hub flange 28 and the floating plates 32, 32A that must be accomplished to bring into substantial coincidence the leading edges 2811 and 3211 at the respective set of windows having those edges, and simultaneously to bring into substantial coincidence the trailing edges 1822 and 3222 at the respective set of windows having said edges 1822, 3222. The angular value K represents the angle of the relative rotation between the hub flange 28 and the floating plates 32, 32A that must be accomplished to bring into substantial coincidence the leading edges 1811 and 3211 at the respective set of windows having those edges, and simultaneously to bring into substantial coincidence the trailing edges 2822 and 3222 at the respective set of windows having said edges 2822, 3222.

The situation in FIG. 4 is also represented in FIG. 5 which only illustrates two sets of windows in alignment axially of the driven plate. The code used to represent windows in FIG. 5 is used in FIGS. 6 to 11, namely the side plates windows 181 and 182 are shown in full lines, the hub flange windows 281 and 282 are in dotted lines, and the floating plates windows 321 and 322 are in dash-dot lines; furthermore, for clarity the radial size of the windows 321 and 322 have been shown reduced in FIGS. 5 to 11 to distinguish them more from the windows 281 and 282.

Returning to FIG. 1, the driven plate 4 is provided with an "idling centre" 40 for reducing the chance of an "idle rattle" in a transmission line when the driven plate is used in a motor vehicle clutch. That "idling centre" is a weak torsional vibration damper comprising a plurality of weak auxilliary compression springs 42 in windows in a disc-like plate 44 and in a disc-like plate 46 which interacts with the windows 281 and 282 in the hub flange 28 and is acted on by an annular spring 48. The "idling centre" 40 is described in our published British Patent Application No. GB 2131 914A and will not be described further since it is not essential to the present invention and may be omitted from the clutch driven plate if desired. But if the "idling centre" 40 is used, then there will need to be some circumferential free play between the splines 24 and 26 (as described in GB 2131 914A). The components of the driven plate 4 are maintained together axially by C-clips 50 and 52 and the driven plate further comprises a wavy spring washer 54, and bearing rings or washers 56, 58 and 60 any of which can be an hysteresis washer.

In the following description of operation, the driven plate 4 is in a clutch between the engine and transmission line in a motor vehicle. The operation will be particularly described with reference to FIGS. 5 to 12, in which the two springs 36 in FIG. 4 are indicated at 36A and 36B in FIGS. 5 to 11.

Starting with FIG. 5, the vehicle is stationary, the clutch comprising the driven plate 4 is disengaged, and the driven plate parts are in the "central" position. The clutch is then engaged and drive condition D (FIG. 12) commences by the engine applying input torque to the carrier assembly 18, 16, 18A (FIG. 1) which readily rotates in direction H with the springs 36, the floating plates 32, 32A and the hub flange 28 relatively to the hub 10 through the circumferential free-play between the splines 24 and 26. This is the situation shown at OL in FIG. 12. When all that free-play is taken up, the carrier assembly, floating plates, hub flange and springs 36 are still in the "central" position (FIG. 5). Continued application of an increasing torque input T (FIG. 12) to the carrier assembly 18, 16, 18A (FIG. 1) now causes it to rotate in direction H relative to the hub flange 28. This is the situation shown in FIG. 6, where the movement of trailing end 1812 of the window 181 of each side plate 18, 18A pushes the spring 36A against the leading end 3211 of the window 321 of each floating plate 32, 32A in direction H relatively to the hub flange 28 causing the trailing end 3222 of the window 322 in each floating plate to push the spring 36B against leading end 2821 of the window 282 of the hub flange. The compression of the two springs 36A and 36B provides rotational damping during a first stage of damping represented by portion LN of the graph in FIG. 12. Throughout this first stage the springs 36A and 36B are compressed in series, the leading end of the spring 36A pushing via the floating plates 32, 32A on the trailing end of the spring 36B. Whilst this series compression is taking place, the floating plates 32, 32A rotate relatively to the hub 10 and hub flange 28 through an angle which is only substantially half the angle through which the side plates 18, 18A have rotated relatively to the hub and hub flange. The end of the first damping stage corresponding to point N in FIG. 12, is shown in FIG. 7. In the transition from position L to position N in FIG. 12 during increasing torque T input, the carrier assembly 18, 16, 18A has rotated, relatively to the hub 10 and hub flange 28, through the angle 2J° (i.e. twice the angle J° of FIGS. 4 & 5). Therefore hub spring 36A and 36B is compressed by only half as much as if they would have been had they been subject to parallel compression between the side plates 18, 18A and hub flange 28 without the floating plates 32, 32A being present, for a relative rotation between the side plates and the hub flange of J°. Although only springs 36A and 36B have been referred to, it will be understood that the other two springs 36 (FIG. 4) undergo similar compression as the springs 36A and 36B in the operations shown in FIGS. 5 to 11.

The point N in FIG. 12 shows the end of the first stage of damping at drive D condition. There is then a torque step (for reasons described hereinafter) to point W which is the beginning of the second stage which is performed between W and P. At the end of the first stage, (FIG. 7), the trailing end 1822 of the window 182 in each side plate now coincides with the trailing end 3222 of the window 322 of each floating plate 32, 32A whilst the leading end 2811 of the window 281 in the hub flange 28 (FIG. 1) now coincides with the leading end 3211 of the window 321 in each floating plate. Therefore, during second stage damping, all the springs 36 (FIG. 5) are simultaneously compressed in parallel between the trailing ends of the windows in the side plates 18, 18A (FIG. 1) and the leading ends of the windows in the hub flange 28 as the carrier arrangement 18, 16, 18A continues to rotate relatively to the hub 10 and hub flange 28 in the direction H. A situation which occurs in the course of the stiffer second damping stage is shown in FIG. 8. As the input torque T increases point P (FIG. 12) can be eventually reached where no more second stage damping is available under drive D condition. This occurs when the carrier arrangement 18, 16, 18A (FIG. 1) has rotated through R° relatively to the hub flange 28 to bring the stop rivets 16 into abutment with sides of the notches 30 (FIG. 2).

Starting again with FIG. 5 with the driven plate 4 in the "central" position, now if an over-drive O-D condition (FIG. 12) commences the torque input to the clutch is applied to the hub 10 (FIG. 1) from the transmission to drive the engine. Initially the hub 10 rotates readily in direction H relatively to the hub flange 28, the springs 36 and the carrier assembly 18, 16, 18A to take up the circumferential free-play between the splines 24 and 26. This is the situation shown at OQ in FIG. 12. As the over-drive input torque increases a first damping stage occurs (represented by section QS in FIG. 12) during which, as shown in FIG. 9, the springs 36A and 36B are compressed in series. This is because the hub flange 28 (FIG. 1) rotates in direction H relatively to the side plates 18 and 18A and so the trailing end 2812 of the window 281 of the hub flange presses the spring 36A against the leading end 3211 of the window 321 in each floating plate 32, 32A. Therefore the trailing end 3222 of the window 322 in each floating plate presses the spring 36B against the leading end 1821 of the window 182 in each side plate 18 and 18A. The first stage ends (point S in FIG. 12) when the leading end 3211 of each window 321 in the floating plates 32, 32A comes into coincidence with the leading end 1811 of each window 181 in the side plates 18, 18A so that spring 36A starts to press against each leading end 1811 as shown in FIG. 10. At the same time the trailing end 2822 of the window 282 in the hub flange 28 comes into coincidence with the trailing end 3222 of the window 322 so that the trailing end 2822 compresses the spring 36B against the leading ends 1821 of the window 182 in each side plate 18, 18A. During the course of the first stage of damping in over-drive 0-D condition (FIG. 12), the hub 10 and hub flange 28 rotate relatively to the carrier assembly 18, 16, 18A through the angle 2K° which is twice the angle K° through which floating plates 32 and 32A have rotated relatively to the carrier assembly.

Should torque input in the over-drive direction continue to increase then from point S (FIG. 12) there is a torque step (for reasons described hereinafter) to point Y and a stiffer second stage of damping represented by the section YU in FIG. 12 occurs during which, as shown in FIG. 11 the springs 36A, 36B (all the springs 36 in FIG. 4) are simultaneously compressed in parallel between the trailing ends of the windows in the hub flange 28 (FIG. 1) and the leading ends of the windows in the side plates 18 and 18A. As the over-drive input torque increases, point U can be eventually reached where no more damping is available due to the stop rivets 16 coming into abutment with sides of the notches 30 (FIG. 2) when the hub flange 28 has notched in direction H through V° relatively to the side plates 18 and 18A.

During the transition from first to second stage damping in either drive or over-drive conditions the torque step at WN or SY (FIG. 12) occurs. This is because during the first stage of damping the radially outermost circumferential portion of each spring is compressed or nipped more than the radially innermost circumferential portion. This compression characteristic which is maintained during the second stage of damping accentuates the sudden increased resistance to compression experienced at the transition from series compression of the springs 36A, 36B to parallel compression. To reduce or eliminate the torque steps WN and SY (FIG. 12) and thus increase the chance of a smoother transition from first to second stage damping, the aforesaid windows, for example in the hub flange 28 and floating side plates 32, 32A, can be shaped to ensure that there is compression or loading of the springs 36 at their radially innermost circumferential portions in the course of first and/or second stage damping. An idea of how windows may be shaped to vary loading of torsion springs is described in our European Patent Application No. EP.0073 594 A1.

In a modification, one of the floating side plates 32 or 32A can be omitted, however the side plates, hub flange and the remaining floating plate should be held close together axially to prevent sloppiness.

It will also be understood that the use of one or more floating plates 32, 32A or their equivalents, to enable torsional vibration damping to be switched from first stage relatively weak damping by pairs of compression springs in which in each pair the two springs are compressed in series to second stage stiffer damping in which the two compression springs in each pair are compressed simultaneously in parallel, can be applied to the torsional vibration damping in a divided or split fly-wheel, which may be used in a motor vehicle.

Although the above description refers to first stage relatively weak damping comprising compressing two springs in series and then in second stage by compressing the two springs in parallel, the first stage may comprise compressing three or more compression spring means in series and the second stage may comprise compressing two or more of these spring means in parallel.

What is claimed is:

1. A rotary coupling device comprising a hub having an annular flange mounted thereon, a coaxial annular driven plate mounted on the hub for limited rotational movement relative to the hub flange, a coaxial annular floating plate also mounted on the hub for limited rotational movement relative to both the hub flange and the driven plate, and at least two sets of spring means each housed in a respective set of aligned spring windows each spring window having two opposed circumferential ends formed by respective window edges in the hub flange, the driven plate and the floating plate and which resist the relative rotational movement therebetween so that said spring means determines an "at-rest" state when the driven plate is subject to no external torsional loads, wherein in each of said two sets of spring windows the hub flange window, the driven plate window and the floating plate windows are of different circumferential lengths and are arranged so that in the "at rest" state, for a first set of spring windows all the window edges at one circumferential end of the respective windows in said first set are in circumferential alignment, and for the second set of spring windows all the window edges of the respective windows in said second set are in alignment at the the other of said two opposed circumferential ends to said first set of windows, so that during an initial phase of rotational movement of the driven plate relative to the hub flange the two spring means act in series and in a later phase of said rotational movement the two spring means act in parallel.

2. A rotary coupling device as claimed in claim 1 wherein in the said first set of windows the driven plate window has the greatest circumferential length, and the floating plate window the smallest circumferential length, and in the second set of windows the hub flange window has the greatest circumferential length and the floating plate window the smallest circumferential length.

3. A rotary coupling device as claimed in claim 2 wherein the circumferential lengths of the floating plate windows in said first set and said second set of windows are substantially the same.

4. A rotary coupling device as claimed in claim 2, which is in the "at rest" state, wherein for said first set of spring windows the respective window edges are in alignment at a leading circumferential end of said first set, and for said second set of spring windows the respective window edges are in alignment at a trailing circumferential end of said second set, whereas the terms leading and trailing refer to the direction of rotation of the driven plate relative to the hub flange during the drive condition of the coupling device while in use.

5. A rotary coupling device as claimed in claim 2, wherein for said first set of spring windows the circumferential length of the driven plate window exceeds the circumferential length of the floating plate window by a distance equivalent to a first desired angle of relative rotation, and for the second set of spring windows the circumferential length of the hub flange windows exceeds the circumferential length of the floating plate window by a distance also equivalent to said first desired angle of rotation.

6. A rotary coupling device as claimed in claim 5 wherein for said first set of spring windows the circumferential length of the hub flange window exceeds the circumferential length of the floating plate window by a distance equivalent to a second desired angle of relative rotation and which is smaller than said first desired angle of rotation, and for the second set of spring windows the circumferential length of the driven plate window exceeds the circumferential length of the floating plate window by a distance also equivalent to said second desired angle of rotation.

7. A rotary coupling as claimed in claim 1 in which there are four spring means in four sets of spring windows, there being two sets of said first set of spring windows which are arranged diametrically opposite each other, and two sets of said second set of spring windows also diametrically opposite each other.

8. A rotary coupling device as claimed in claim 1 wherein the coupling device is a friction clutch driven plate for a vehicle friction clutch, and the driven plate comprises a facing carrier plate arranged to one axial side of the hub flange and to which a friction facing is secured, and a side plate is arranged on the other axial side of the hub flange and is fastened to the carrier plate by stop pins which pass through apertures in the hub flange to limit the angular rotation between the hub flange and the driven plate, and there are also provided two floating plates which are located one on each side of the hub flange between said flange and a respective one of the carrier and side plates, and which also have apertures therein to accommodate the stop pins.

9. A rotary coupling device as claimed in claim 1, wherein the coupling device is a split flywheel, and said driven plate forms part of a first flywheel arrangement and the hub forms part of a second flywheel arrangement spaced axially from the first flywheel arrangement.

10. A friction clutch driven plate as claimed in claim 8, wherein in the "at rest" position each stop pin passes through a respective aperture in the hub flange so that from the "at rest" position the facing carrier plate can rotate further in one direction of rotation than in the other direction of rotation.

* * * * *